United States Patent [19]

Wilson

[11] 3,795,146
[45] Mar. 5, 1974

[54] REFERENCE SIGNAL DIFFERENTIATING CAPACITIVE FLUID LEVEL GAUGE

[75] Inventor: Francis B. Wilson, Wauconda, Ill.

[73] Assignee: Vapor Corporation, Chicago, Ill.

[22] Filed: May 12, 1972

[21] Appl. No.: 252,796

[52] U.S. Cl. .............................. 73/304 C, 324/61 R
[51] Int. Cl. ..................... G01f 23/26, G01r 27/26
[58] Field of Search......... 73/304 C, 362 R, 398 C; 324/61 R

[56] References Cited
UNITED STATES PATENTS
2,920,214   1/1960   Moore........................... 73/398 C X
3,580,074   5/1971   Westcott et al................... 73/304 C
2,375,084   5/1945   Cornoiti et al.................... 73/304 C
2,506,143   5/1950   Edelman ........................ 73/304 C X
3,349,301   10/1967  Bell................................ 317/247 X Primary Examiner—Richard C. Queisser
Assistant Examiner—Frederick Shoon
Attorney, Agent, or Firm—Morris Liss; Joseph M. Roehl

[57] ABSTRACT

An open loop capacitance-type level gauge that utilizes a triangular reference voltage, a differentiator means including a capacitor probe, an absolute value amplifier, and a utilization means for providing a linear voltage directly proportional to the level of fluid contained in a vessel is disclosed.

3 Claims, 4 Drawing Figures

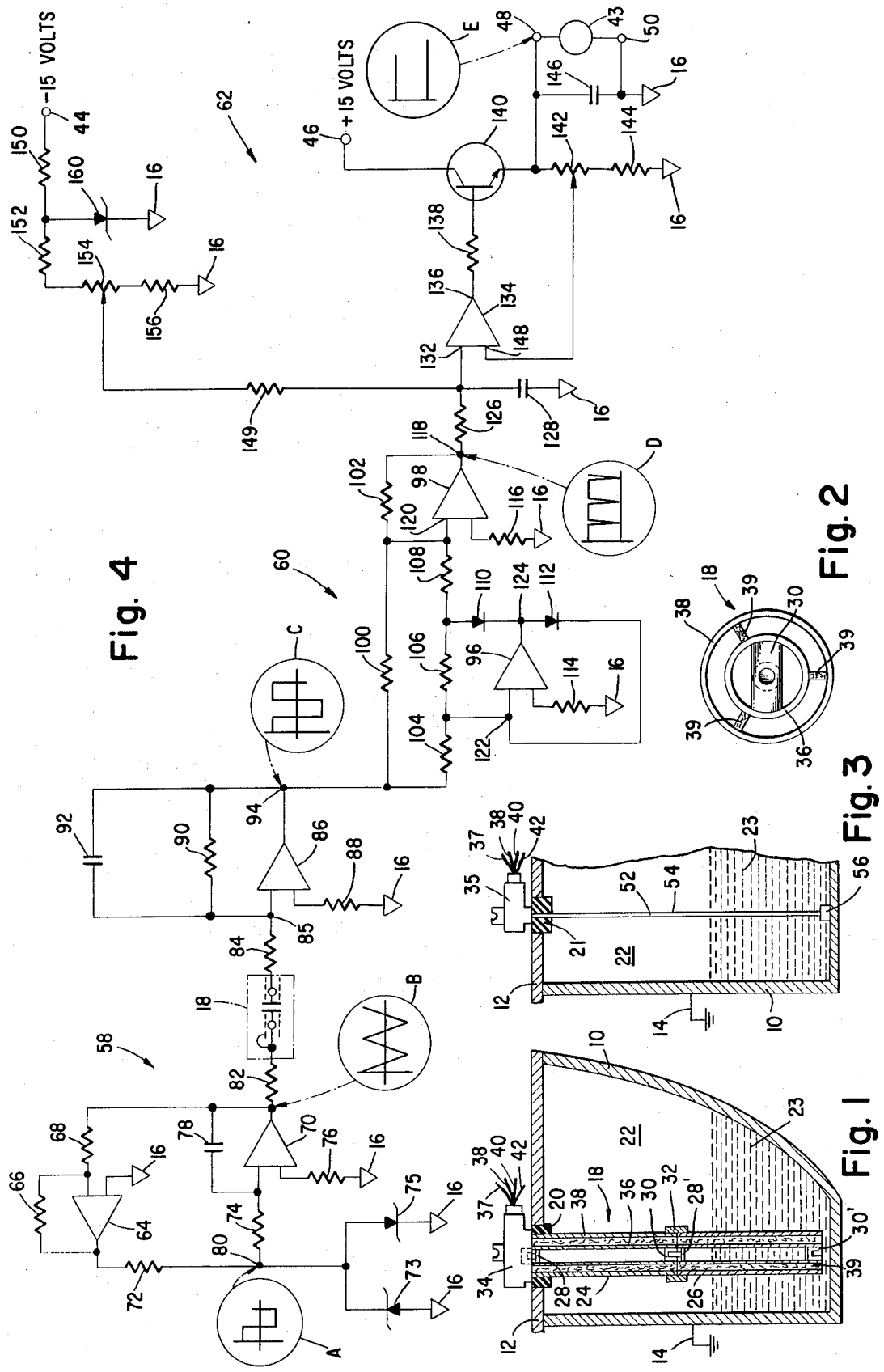

REFERENCE SIGNAL DIFFERENTIATING CAPACITIVE FLUID LEVEL GAUGE

BACKGROUND OF THE INVENTION

This invention relates to the measurement of fluid level in a vessel and, in particular, to an accurate, continuous, and stable means for measuring for example, the fuel level in storage tanks.

At the present time virtually all fluid level gauging systems utilize the principle that the capacitance between two plates immersed in a fluid will vary in accordance with the fluid level between the plates. If the two plates are used to form a capacitor probe and the probe is inserted into a fluid containing tank the capacitance of the probe will be proportional to the level and related to the volume of the fluid in the tank, since the fluid level alters the dielectric of the capacitor probe. Open loop fluid measuring techniques frequently use a reference oscillator and a tuned circuit in which a capacitor probe is one member of the tuned circuit, or they use a bridge circuit configuration wherein a voltage is developed across a capacitor probe and a change in fluid level unbalances the bridge by causing a phase shift or amplitude variation, thereby providing an output voltage proportional to the fluid level. Other techniques rely on the frequency stability of a reference oscillator which is compared to the frequency generated by a secondary oscillator. The frequency of the secondary oscillator is controlled by a capacitor probe immersed in a fluid containing tank. The difference in frequency between the reference oscillator and secondary oscillator is proportional to the amount of fluid in the tank. The prior art systems frequently have a non-linear output which makes readings over certain portions of the scale difficult. The change in the gain of associated amplifiers, or the change in the frequency of the reference oscillators, with time and temperature variations affect the accuracy of the systems.

SUMMARY OF THE INVENTION

The present invention overcomes the disadvantages of the prior art by providing an output voltage which is linearly related to the level of fluid in a vessel or container. The accuracy of the system is not dependent upon amplifier gain or frequency stability.

A capacitance-type fluid level gauge, incorporating the principles of the present invention, comprises a capacitor probe adapted to be inserted into a fluid containing vessel, reference oscillator means coupled to the capacitor probe for providing a triangular voltage of relatively constant frequency and amplitude, circuit means coupled to and cooperating with the capacitor probe for differentiating the triangular voltage and providing a DC voltage proportional to the capacitance of the probe, translating means coupled to the circuit means for providing a DC output voltage directly proportional to the level of fluid contained in the vessel, and indicating means having the DC output voltage coupled thereto for indicating the level of fluid in said vessel.

BRIEF DESCRIPTION OF THE DRAWING

FIG. 1 is a simplified pictorial representation of a capacitor probe installed in a hull of a tanker;

FIG. 2 is a bottom view of the capacitor probe shown in FIG. 1;

FIG. 3 is part of a simplified pictorial representation of an alternate embodiment of a capacitor probe installed in a hull of a ship; and FIG. 4 is a schematic circuit diagram of a preferred embodiment of the present invention in accordance with the principles of the present invention.

DESCRIPTION OF THE PREFERRED EMBODIMENTS

Referring now to the drawing and in particular, to FIG. 1, the numeral 10 refers to a partial view of a hull of a tanker ship. The hull 10 has a deck 12 secured thereto which together form an earth ground 14. Earth ground 14 is completely isolated from the ground reference terminal 16 used in conjunction with the cooperating circuitry shown in FIG. 4.

A capacitor probe 18 is installed in the ship's deck, via an insulating bushing 20, and extends downwardly almost touching the bottom of the tank compartment 22 formed by the ship's hull 10 and deck 12. Further support means, not shown, may be attached to the hull or the deck to maintain the probe 18 in a rigid position within the fluid, in this case fuel 23.

The probe 18 is comprised of multiple sections 24 and 26. Each section is respectively provided with a male connector 28 and 28' and a female connector 30 and 30'. The sections 24 and 26 are mated together and retained in position with the aid of a conductive collar 32. In the preferred embodiment of the invention each section is connected together, as described, to provide a total length sufficient to extend proximate the bottom of the ship's hull. The sections may be made substantially any desired length and coupled together in sufficient numbers depending upon the depth of the hull.

Affixed to the male connector 28 of section 24 is a conventional junction box and cover 34 which makes contact with the inner metallic cylinder 36 and outer metallic cylinder 38 of the probe 18 and is, when required, insulated from the earth ground 14 by the insulating bushing 20. Cylinders 36 and 38 function as the first and second plate of the capacitor probe 18. As shown in FIG. 2, insulated spacers 39 are provided to keep the inner cylinder 36 concentrically located within the outer cylinder 38. Mounted within function box 34 in a known manner, is a printed circuit assembly, not shown, within which is contained all of the cooperating circuitry shown in FIG. 4.

The electrical power for operation of the circuitry, which in the preferred embodiment is ±15 volts DC, is supplied from a remotely located power supply, not shown, via wires 37 and 38, while output wires 40 and 42 are connected in a suitable manner to the indicating meter 43 shown in FIG. 4. Wires 37, 38, 40 and 42 are connected respectively to terminals 44, 46, 48 and 50 shown in FIG. 4. Terminal 50 which is connected to the common ground reference 16 of the cooperating circuitry, is isolated from the earth ground 14, as explained earlier.

In an alternate embodiment of the invention, shown in FIG. 3, the capacitor probe consists of a thin rod or wire 52, which extends into the tank compartment 22. The rod or wire is evenly coated with a layer of insulating material and functions as one plate of the capacitor probe. The ship's hull 10 and deck 12 function as the second plate of the capacitor probe. One end of the wire 52 is insulated and provided with a weight 56 to maintain it in a vertical position. The rod or wire 52 is coupled through the deck 12, via insulator 21, and has connected thereto a condulet 35 which functions in the same manner as junction box 34 described in conjunction with FIG. 1.

Referring now to FIG. 4, there is shown schematically the cooperating circuitry mounted within the condulet junction boxes 34 and 35. The cooperating circuitry comprises a reference oscillator means 58, circuit means 60, translating means 62, all of which have coupled thereto the B+ voltage (±15 volts DC), and an indicating means 43.

Included in the reference oscillator means 58 is a bi-directional trigger switch or astable multivibrator comprised of a conventional non-inverting operational amplifier 64 and resistors 66 and 68. Resistor 66 is connected from the non-inverting input terminal of amplifier 64 to the output terminal of amplifier 64. The other input terminal of amplifier 64 is connected to the common reference terminal 16. Resistor 68 is connected to the output terminal of reference integrator amplifier 70, which is of the inverting type. Resistors 72 and 74 are connected in series from the output terminal of amplifier 64 to the inverting input terminal of amplifier 70. The other input terminal of amplifier 70 is coupled, via a resistor 76, to the common terminal 16. Resistor 76 provides temperature compensation for the amplifier 70. A capacitor 78 is coupled from the output terminal of amplifier 70 to the common connection of resistor 74 and the inverting input terminal of amplifier 70. A pair of Zener diodes 73 and 75 are, connected in parallel and poled in opposite directions (back to back), from the common connection point 80 of resistors 72 and 74, to common terminal 16.

The bi-directional switch referred to earlier, generates a square wave A which is coupled, via resistor 72, to point 80 where its peak-to-peak amplitude is limited to 6.2 volts in the positive direction and 6.2 volts in the negative direction by Zener diodes 73 and 75.

The square wave A is then integrated by the circuit arrangement of resistor 74, capacitor 78 and inverting amplifier 70, thereby providing a sawtooth wave B, which has a constant slope, at the output terminal of amplifier 70. The constant slope of sawtooth wave B provides a constant charging current for a relatively fixed period of time to capacitor probe 18, via resistor 82.

The sawtooth wave B, after passing through the capacitor probe 18 is coupled, via resistor 84, to the inverting input terminal 85 of operational amplifier 86. Resistors 82 and 84 limit fault currents to intrinsic safe energy levels and prevents damaging of the circuitry, should either the inner or outer plate of the capacitor probe 18 be inadvertently shorted to earth ground in the embodiment shown in FIG. 1. The other input terminal of amplifier 86 is coupled, via resistor 88, to common terminal 16. Resistor 90 is connected from the output terminal 86 to the common connection of resistor 84 and the inverting input terminal of amplifier 86 and in the preferred embodiment is selected to provide a ±2 volt peak-to-peak amplitude for the square wave C. The value of resistor 90 depends on the construction of the probe 18. Capacitor 92 is connected in parallel with resistor 90, reduces the transients caused by the square wave, and stabilizes the differentiator circuit configuration formed by probe capacitor 18, resistor 90 and amplifier 86.

At the output terminal 94 of amplifier 86 a square wave C occurs as a result of the differentiation of the constant slopes of sawtooth wave B coupled to the input terminal 85. Since the probe capacitor is part of the differentiator circuit, its output is proportional to the rate of change of its input, which is the sawtooth wave B. Therefore, since wave B changes polarity each half cycle the output 86 is the square wave C. The amplitude of the square wave C is directly proportional to the value of the probe capacitor, which in turn depends on the dielectric constant and level of the fluid occurring between the plates of probe capacitor 18.

The square wave C is coupled to the absolute value amplifier circuitry which is comprised of inverting operational amplifiers 96 and 98; scaling resistors 100, 102, 104, 106 and 108; diodes 110 and 112; and temperature compensating resistors 114 and 116. Scaling resistors 100 and 102 are connected in series from the output terminal 94 of amplifier 86 to the output terminal 118 of amplifier 98. Resistors 104, 106 and 108 are connected in series from the output terminal 94 to the inverting input terminal 120 of amplifier 98. The common connection of resistors 104 and 106 is connected to the inverting input terminal 122 of amplifier 96. The common connection of resistors 100 and 102 is connected to the inverting input terminal 120 of amplifier 98.

The anode electrode of diode 110 is connected to the common connection of resistors 106 and 108 and the cathode electrode of diode 110 is connected to the output terminal 124 of amplifier 96. The anode electrode of diode 112 is connected to the output terminal 124 and the cathode electrode of diode 112 is connected to the input terminal 122 of amplifier 96.

Resistors 114 and 116 are connected from the other input terminal of amplifiers 96 and 98 respectively to the common reference terminal 16 and provide stability of the operating points (temperature compensation) for operational amplifiers 96 and 98.

The positive going portion of square wave C is coupled, via resistor 104, to the input terminal 122 of inverting amplifier 96 where it causes a negative output voltage to appear at output terminal 124. The negative voltage at terminal 124 causes diode 110 to conduct, thereby coupling the negative voltage to the input terminal 120 of amplifier 98. Amplifier 98, being of the inverting type also, as explained earlier, inverts the negative voltage and provides a positive voltage at output terminal 118 as shown in the first portion of the voltage wave illustrated pictorially at D.

The negative going portion of the square wave C is also coupled to terminal 122 of amplifier 96 which inverts it and provides a positive voltage at terminal 124. A positive voltage at terminal 124 causes diode 112 to conduct, thereby clamping output terminal 124 to input terminal 122. The voltage at terminal 124 causes diode 110 to be cut-off or non-conducting, thereby permitting the negative going portion of the square wave C to be coupled to the input terminal 120 of amplifier 98 via resistors 104, 106 and 108, as well as via resistors 100 and 102. The negative going voltage is then inverted by inverting amplifier 98 to provide the second portion of wave D at terminal 118. The operation of the absolute value amplifier, hereinbefore referred to, is repeated for succeeding portions of the square wave C. It is to be noted that the scaling resistors 100, 102, 104, 106 and 108 are selected to provide equal outputs at terminal 118 for both the positive and negative going portions of the square wave. The output wave D is equal to the absolute value of the input square wave C regardless of polarity.

The absolute value amplifier output voltage D at output terminal 118 of amplifier 98 is coupled, via a resistor capacitance filter comprised of a resistor 126 and a capacitor 128, to the input terminal 132 of a non-inverting operational amplifier 134, which filters out any ripple or transients introduced by the square wave or the absolute value amplifier.

The DC voltage is amplified by the translating means 62 comprised of the non-inverting amplifier 134, and is coupled from the output terminal 136 of amplifier 134, via a resistor 138, to the base electrode of transistor 140, which is connected in an emitter follower configuration. The collector electrode of transistor 140 is connected to B+ terminal 46, which in the preferred embodiment of the invention, is connected to a power source of +15 volts. The emitter electrode of transistor 140 is coupled, via variable resistor 142 and resistor 144 connected in series, to reference terminal 16. The emitter electrode of transistor 140 is also coupled to terminal 48 which is connected to a utilization means, such as a DC meter 43. The other end of the meter is connected to terminal 50 which is connected to the common reference terminal 16. A capacitor is connected across terminals 48 and 50 to provide additional filtering and removal of noise from the DC voltage E, that is coupled to the utilization means. The movable arm of variable resistor 142 is connected to the other input terminal 148 of amplifier 134 and provides a means for adjusting the span or full scale range of the utilization means or meter.

A negative DC voltage, which in the preferred embodiment of the invention is −15 volts, is connected to terminal 44 and is coupled to the input terminal 132 via a resistor 149 and a voltage divider comprised of resistors 150, 152, 154 and 156. Resistor 154 is a variable resistor with its movable arm connected to resistor 140 to permit adjustment of the negative voltage. A Zener diode 160 is connected from the common connection of resistors 150 and 152 to the reference ground terminal 16 and functions to regulate the DC voltage connected to terminal 44.

In operation, the junction box 34 is coupled to the capacitor probe 18 each time readings are to be taken, or it may be more premanantly affixed. The probe 18 may be permanently mounted within a storage tank or inserted into the storage tank prior to use. The reference oscillator 58 provides a sawtooth wave which is coupled to the capacitor probe 18. The capacitor probe in combination with the circuit means 60 generates a DC voltage which is coupled to the translating means 62 which amplifies the voltage and provides a full scale adjustment for the utilization means, as explained earlier, and provides power amplification with the aid of the emitter follower transistor 140.

The amplitude of the square wave C is set to ±2 volts peak-to-peak, in the preferred embodiment of the invention, by selecting resistor 90. The bias adjustment resistor 154 is adjusted for zero output at the initial value of square wave C with no liquid between the capacitor probe plates. Resistor 142 sets the full scale output voltage E, which in the preferred embodiment is 10 volts, that is coupled to a voltmeter, 43.

It is to be noted that, although the preferred embodiment of the invention is disclosed in relation to a fuel tanker ship, the present invention may be used with equal accuracy to measure the level of fluids stored in any tank or vessel and is equally suitable, for example, to measure the level of grains stored in silos, etc., and it is not intended that the scope of the invention be limited to fuel tanker ships. It is further contemplated that the disclosed capacitor probe may be made portable and inserted into storage vessels, as required, for measurement purposes. Also, it is to be noted that, if the level of a fluid in a vessel of known volume is measured the quantity of fluid in the vessel is known, and the meter scale may be calibrated in volume units instead of percentage of fullness for convenience. The relative volume of one fluid with respect to another or the level of interface between conductive and non-conductive fluids may also be measured with this invention; as long as the dielectric constants of the fluids are dissimilar.

It is further to be noted that in the preferred embodiment of the invention all the operational amplifiers are solid state modules.

Hereinbefore has been disclosed a relatively simple, compact, capacitance-type fluid gauge, which is capable of accurately measuring the level of fluid in tanks or level of other materials such as the quantity of grain in a silo. The gauge of the invention does not require well regulated voltages for operation and is ideally suited for fixed as well as portable applications.

What I claim is:

1. A capacitance-type fluid level gauge comprising:

a. a capacitor probe adapted to be inserted into a fluid containing vessel;
   b. reference oscillator means coupled to said capacitor probe for providing a triangular voltage of relatively constant frequency and amplitude, said reference oscillator means including:
   trigger means having input and output terminals for providing a bi-directional trigger voltage;
   reference integrator means having input and output terminals for integrating said trigger voltage, said integrator output terminal being coupled to an input terminal of said trigger means and said integrator input terminal being coupled to the output terminal of said trigger means; and
   a pair of oppositely poled Zener diodes coupled to a common connection of the output terminal of said trigger means and the input terminal of said reference integrator means for maintaining said reference oscillator means at a relatively constant amplitude;
   c. circuit means coupled to and cooperating with said capacitor probe for differentiating said triangular voltage and further providing a DC operating voltage proportional to the capacitance of said probe;
   d. translating means coupled to said circuit means for amplifying the DC operating voltage to a DC output voltage directly proportional to the level of fluid contained in said vessel; and
   e. indicating means having said DC output voltage coupled thereto for indicating the level of fluid in said vessel.

2. A capacitance-type fluid level gauge comprising:

a. a capacitor probe adapted to be inserted into a fluid containing vessel;

b. reference oscillator means coupled to said capacitor probe for providing a triangular voltage of relatively constant frequency and amplitude;

c. circuit means coupled to and cooperating with said capacitor probe for differentiating said triangular voltage and further providing a DC operating voltage proportional to the capacitance of said probe, the circuit means having a rectifier-amplifier including:

a first operational amplifier having input and output terminals;

a second operational amplifier having input and output terminals;

a first resistor coupled from the output terminal to an input terminal of said second amplifier;

a first diode having first and second electrodes, said first electrode being connected to the output terminal of said first amplifier and said second electrode being connected to an input terminal of said first amplifier;

a second diode having first and second electrodes, said first electrode being connected to the output terminal of said first amplifier, and said second electrode being connected through a second resistor to the input terminal of said first amplifier; and means coupled to the input terminals of said first and second amplifiers for coupling said differentiated triangular voltage thereto, whereby the DC operating voltage is provided at the output terminal of said second amplifier that is equal to the peak value of said differentiated triangular voltage;

d. translating means coupled to said circuit means for amplifying the DC operating voltage to a DC output voltage directly proportional to the level of fluid contained in said vessel; and e. indicating means having said DC output voltage coupled thereto for indicating the level of fluid in said vessel.

3. A capacitance-type fluid level gauge comprising:

a. a capacitor probe adapted to be inserted into a fluid containing vessel;

b. reference oscillator means coupled to said capacitor probe for providing a triangular voltage of relatively constant frequency and amplitude;

c. circuit means coupled to and cooperating with said capacitor probe for differentiating said triangular voltage and further providing a DC operating voltage proportional to the capacitance of said probe;

d. translating means coupled to said circuit means for amplifying the DC operating voltage to a DC output voltage directly proportional to the level of fluid contained in said vessel, wherein said translating means includes:

an operational amplifier having first and second input terminals and an output terminal, said first input terminal being resistance coupled to a reference terminal, said second input terminal being adapted to be coupled to a DC voltage;

a transistor having emitter, base, and collector electrodes connected in an emitter follower configuration, said collector electrode being adapted to be connected to a source of operating voltage, said emitter electrode being resistance coupled to said reference terminal and said base electrode being coupled to the output terminal of said amplifier; and variable resistance means coupled between said first input terminal of said amplifier and the emitter electrode of said transistor for adjusting the amplitude of said DC output voltage; and e. indicating means having said DC output voltage coupled thereto for indicating the level of fluid in said vessel.

* * * * *